(12) United States Patent
Haddock (10) Patent No.: US 10,634,175 B2
(45) Date of Patent: Apr. 28, 2020

(54) MOUNTING DEVICE FOR NAIL STRIP PANELS

(71) Applicant: RMH Tech LLC, Colorado Springs, CO (US)

(72) Inventor: Dustin M. M. Haddock, Colorado Springs, CO (US)

(73) Assignee: RMH Tech LLC, Colorado Springs, CO (US)

( * ) Notice: Subject to any disclaimer, the term of this patent is extended or adjusted under 35 U.S.C. 154(b) by 0 days.

(21) Appl. No.: 15/628,927

(22) Filed: Jun. 21, 2017

(65) Prior Publication Data

US 2018/0128295 A1 May 10, 2018

Related U.S. Application Data

(63) Continuation of application No. 13/720,461, filed on Dec. 19, 2012, now abandoned.
(Continued)

(51) Int. Cl.
| F16B 2/06 | (2006.01) |
| E04D 3/361 | (2006.01) |
| E04D 3/365 | (2006.01) |
| F24S 25/63 | (2018.01) |
| E04D 13/10 | (2006.01) |

(Continued)

(52) U.S. Cl.
CPC .............. *F16B 2/065* (2013.01); *E04D 3/361* (2013.01); *E04D 3/365* (2013.01); *E04D 13/10* (2013.01); *F24S 25/63* (2018.05); *E04D 3/363* (2013.01); *F24S 25/615* (2018.05)

(58) Field of Classification Search
CPC ........ F24J 2/5249; E04D 13/10; E04D 3/366; E04D 3/361; E04D 3/362; E04D 3/363; E04D 3/364; E04D 3/365; E04D 13/12; E04D 13/00; E04D 3/30; E04G 21/3285; B25B 5/101; B25B 5/067; F16B 2/065; F16B 5/0004; F16B 2200/40; E04F 13/0821; F24S 25/615
USPC ................... 52/24, 545, 547, 519, 520, 463; 248/222.14, 228.6, 230.6, 231.71
See application file for complete search history.

(56) References Cited

U.S. PATENT DOCUMENTS

| 42,992 A | 5/1864 | Howe |
| 97,316 A | 11/1869 | Rogers |

(Continued)

FOREIGN PATENT DOCUMENTS

| AT | 13076 | 8/1903 |
| AT | 26329 | 11/1906 |

(Continued)

OTHER PUBLICATIONS

Sweetwater, ADJ Heavy Duty Lighting C-clamp, Nov. 12, 2011, Website, http ://web. arch ive.org/web/2011111204551 6/http://www. sweetwater.com/store/detai l/CC lamp/.
(Continued)

*Primary Examiner* — Hiwot E Tefera
*Assistant Examiner* — Taylor L Morris
(74) *Attorney, Agent, or Firm* — Sheridan Ross P.C.

(57) ABSTRACT

A mounting device (10) is disclosed having a one-piece body (11). A slot (20) extends into this body (11), and is defined by a slot base (22) and a pair of spaced slot sidewalls (24a, 24b) that each extend from the slot base (22). The slot sidewalls (24a, 24b) are disposed in non-parallel relation to each other.

16 Claims, 4 Drawing Sheets

Related U.S. Application Data (60) Provisional application No. 61/581,305, filed on Dec. 29, 2011.

(51) Int. Cl.
*F24S 25/615* (2018.01)
*E04D 3/363* (2006.01)

(56) References Cited

U.S. PATENT DOCUMENTS

| | | |
|---|---|---|
| 106,580 A | 8/1870 | Hathorn |
| 189,431 A | 4/1877 | Creighton |
| 250,580 A | 12/1881 | Rogers |
| 332,413 A | 12/1885 | List |
| 386,316 A | 7/1888 | Hawthorne |
| 405,605 A | 6/1889 | Sagendorph |
| 407,772 A | 7/1889 | Curtis et al. |
| 446,217 A | 2/1891 | Dickelman |
| 459,876 A | 9/1891 | Powers |
| 472,014 A | 3/1892 | Densmore |
| 473,512 A | 4/1892 | Laird |
| 491,173 A | 2/1893 | Hayward |
| 507,776 A | 10/1893 | Berger et al. |
| 529,774 A | 11/1894 | Baird |
| 602,983 A | 4/1898 | Folsom |
| 756,884 A | 4/1904 | Parry |
| 831,445 A | 9/1906 | Kosmatka |
| 884,850 A | 4/1908 | Peter |
| 927,522 A | 7/1909 | Gery |
| 933,784 A | 9/1909 | Peter |
| 939,516 A | 11/1909 | Laird |
| 1,054,091 A | 2/1913 | Darnall |
| 1,085,474 A | 1/1914 | Peterson |
| 1,136,460 A | 4/1915 | Wright |
| 1,230,363 A | 6/1917 | Baird |
| 1,330,309 A | 2/1920 | Dixon |
| 1,399,461 A * | 12/1921 | Childs ............... B60R 1/06 248/207 |
| 1,463,065 A | 7/1923 | Sieger |
| 1,465,042 A | 8/1923 | Hruska |
| 1,511,529 A | 10/1924 | Standlee |
| 1,735,927 A | 11/1929 | Shaffer |
| 1,735,937 A | 11/1929 | Shaffer |
| 1,893,481 A | 1/1933 | Adams |
| 2,079,768 A | 5/1937 | Levow |
| 2,150,497 A | 3/1939 | Fernberg |
| 2,183,844 A | 12/1939 | Murphy |
| 2,192,720 A | 3/1940 | Tapman |
| 2,201,320 A | 5/1940 | Place |
| 2,250,401 A | 7/1941 | Sylvester |
| 2,274,010 A | 2/1942 | Stellin |
| 2,340,692 A | 2/1944 | Ridd |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| 2,740,027 A | 3/1956 | Budd et al. |
| 2,810,173 A | 10/1957 | Bearden |
| 2,875,805 A | 3/1959 | Flora |
| 3,039,161 A | 6/1962 | Gagnon |
| 3,064,772 A | 11/1962 | Clay |
| 3,095,672 A | 7/1963 | Di Tullio |
| 3,112,016 A * | 11/1963 | Peterson ............ B06B 1/186 248/637 |
| 3,136,206 A | 6/1964 | Adams |
| 3,194,524 A * | 7/1965 | Trumbull ............ F16L 3/13 248/74.2 |
| 3,221,467 A | 12/1965 | Henkels |
| 3,232,573 A * | 2/1966 | Berman ............... H01F 27/06 248/231.71 |
| 3,242,620 A | 3/1966 | Kaiser |
| 3,288,409 A | 11/1966 | Bethea, Jr. |
| 3,296,750 A | 1/1967 | Zaleski |
| 3,298,653 A | 1/1967 | Omholt |
| 3,301,513 A * | 1/1967 | Masao Sugaya ......... F16L 3/24 248/72 |
| 3,307,235 A | 3/1967 | Hennings |
| 3,318,057 A | 5/1967 | Norsworthy |
| 3,333,799 A * | 8/1967 | Peterson ............... B61D 7/32 248/228.6 |
| 3,335,995 A | 8/1967 | Pickles |
| 3,363,864 A | 1/1968 | Olgreen |
| 3,394,524 A | 7/1968 | Howarth |
| 3,425,127 A * | 2/1969 | Long ............... E04G 21/1808 248/230.6 |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,565,380 A * | 2/1971 | Langren ............... A47B 23/02 248/229.1 |
| 3,572,623 A * | 3/1971 | Lapp ................. F16L 3/133 248/72 |
| 3,590,543 A | 7/1971 | Heirich |
| 3,656,747 A | 4/1972 | Revell, Jr. et al. |
| 3,667,182 A | 6/1972 | Stemler |
| 3,667,185 A | 6/1972 | Maurer |
| 3,719,919 A | 3/1973 | Tibolla |
| 3,753,326 A | 8/1973 | Kaufman, Sr. |
| 3,778,537 A | 12/1973 | Miller |
| 3,792,560 A | 2/1974 | Naylor |
| 3,809,799 A | 5/1974 | Taylor |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,904,161 A | 9/1975 | Scott |
| 3,914,001 A | 10/1975 | Nelson et al. |
| 3,921,253 A | 11/1975 | Nelson |
| 3,960,352 A * | 6/1976 | Plattner ............... F16M 11/045 248/309.1 |
| 3,986,746 A | 10/1976 | Chartier |
| 4,001,474 A | 1/1977 | Hereth |
| 4,007,574 A | 2/1977 | Riddell |
| 4,018,538 A | 4/1977 | Smyrni et al. |
| 4,051,289 A | 9/1977 | Adamson |
| 4,130,970 A | 12/1978 | Cable |
| 4,141,182 A | 2/1979 | McMullen |
| 4,162,595 A | 7/1979 | Ramos et al. |
| 4,162,755 A | 7/1979 | Bott |
| 4,189,891 A | 2/1980 | Johnson et al. |
| 4,200,107 A | 4/1980 | Reid |
| 4,203,646 A | 5/1980 | Desso et al. |
| 4,223,053 A | 9/1980 | Brogan |
| 4,261,338 A | 4/1981 | McAlister |
| 4,261,384 A | 4/1981 | Dahlbring |
| 4,270,721 A | 6/1981 | Mainor, Jr. |
| 4,307,976 A | 12/1981 | Butler |
| 4,321,416 A | 3/1982 | Tennant |
| 4,351,140 A | 9/1982 | Simpson |
| 4,366,656 A | 1/1983 | Simpson |
| 4,393,859 A | 7/1983 | Marossy et al. |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| 4,546,586 A * | 10/1985 | Knudson ............... E04C 2/08 52/469 |
| 4,567,706 A | 2/1986 | Wendt |
| 4,570,405 A | 2/1986 | Knudson |
| 4,593,877 A | 6/1986 | van der Wyk |
| 4,601,600 A * | 7/1986 | Karlsson ............... F16B 2/065 403/338 |

(56) References Cited

U.S. PATENT DOCUMENTS

| | | | |
|---|---|---|---|
| 4,656,794 A | 4/1987 | Thevenin et al. | |
| 4,666,116 A * | 5/1987 | Lloyd | F16B 2/065 |
| | | | 248/228.6 |
| 4,674,252 A | 6/1987 | Nicholas et al. | |
| 4,682,454 A | 7/1987 | Simpson | |
| 4,686,809 A | 8/1987 | Skelton | |
| 4,701,586 A | 10/1987 | Hagberg | |
| 4,704,058 A | 11/1987 | Crunwell | |
| 4,773,791 A | 9/1988 | Hartkorn | |
| 4,799,444 A | 1/1989 | Lisowski | |
| 4,805,364 A | 2/1989 | Smolik | |
| 4,809,476 A | 3/1989 | Satchell | |
| 4,810,573 A | 3/1989 | Harriett | |
| 4,835,927 A | 6/1989 | Michlovic | |
| 4,840,529 A | 6/1989 | Phillips | |
| 4,848,858 A | 7/1989 | Suzuki | |
| 4,854,096 A | 8/1989 | Smolik | |
| 4,878,331 A * | 11/1989 | Taylor | E04D 3/363 |
| | | | 52/519 |
| 4,895,338 A | 1/1990 | Froutzis | |
| 4,905,444 A | 3/1990 | Semaan | |
| 4,909,011 A | 3/1990 | Freeman et al. | |
| 4,949,929 A | 8/1990 | Kesselman et al. | |
| 4,970,833 A | 11/1990 | Porter | |
| 4,987,699 A | 1/1991 | Gold | |
| 4,991,368 A | 2/1991 | Amstutz | |
| 5,007,612 A * | 4/1991 | Manfre | A01K 97/00 |
| | | | 220/DIG. 9 |
| 5,019,111 A | 5/1991 | Dempsey et al. | |
| 5,036,949 A | 8/1991 | Crocker et al. | |
| 5,039,352 A | 8/1991 | Mueller | |
| 5,092,939 A | 3/1992 | Nath et al. | |
| 5,094,435 A * | 3/1992 | Depperman | B23K 37/0536 |
| | | | 269/43 |
| 5,118,571 A | 6/1992 | Petersen | |
| 5,119,612 A | 6/1992 | Taylor et al. | |
| 5,125,608 A | 6/1992 | McMaster et al. | |
| 5,127,205 A | 7/1992 | Eidson | |
| 5,138,820 A | 8/1992 | Pearce | |
| 5,140,793 A * | 8/1992 | Knudson | E04D 3/363 |
| | | | 52/520 |
| 5,152,107 A | 10/1992 | Strickert | |
| 5,164,020 A | 11/1992 | Wagner et al. | |
| 5,176,462 A | 1/1993 | Chen | |
| 5,187,911 A | 2/1993 | Cotter | |
| 5,213,300 A | 5/1993 | Rees | |
| 5,222,340 A | 6/1993 | Bellem | |
| 5,224,427 A | 7/1993 | Riches et al. | |
| 5,228,248 A * | 7/1993 | Haddock | E04D 13/10 |
| | | | 52/25 |
| 5,251,993 A | 10/1993 | Sigourney | |
| 5,268,038 A | 12/1993 | Riermeier et al. | |
| 5,271,194 A | 12/1993 | Drew | |
| 5,277,006 A | 1/1994 | Ruster | |
| 5,282,340 A | 2/1994 | Cline et al. | |
| 5,287,670 A | 2/1994 | Funaki | |
| 5,307,601 A | 5/1994 | McCracken | |
| 5,312,079 A * | 5/1994 | Little, Jr. | F16B 2/065 |
| | | | 248/214 |
| 5,313,752 A | 5/1994 | Hatzinikolas | |
| D347,701 S | 6/1994 | McCracken | |
| 5,352,154 A | 10/1994 | Rotter et al. | |
| 5,356,519 A | 10/1994 | Grabscheid et al. | |
| 5,356,705 A | 10/1994 | Kelch et al. | |
| D351,989 S | 11/1994 | Cline et al. | |
| 5,363,624 A | 11/1994 | Cotter | |
| 5,379,567 A | 1/1995 | Vahey | |
| 5,390,453 A | 2/1995 | Untiedt | |
| 5,392,574 A | 2/1995 | Sayers | |
| 5,408,797 A | 4/1995 | Bellem | |
| 5,409,549 A | 4/1995 | Mori | |
| 5,413,063 A | 5/1995 | King | |
| 5,413,397 A | 5/1995 | Gold | |
| 5,417,028 A | 5/1995 | Meyer | |
| 5,425,209 A | 6/1995 | Funaki | |
| 5,426,906 A | 6/1995 | McCracken | |
| 5,439,307 A | 8/1995 | Steinhilber | |
| 5,453,027 A | 9/1995 | Buell et al. | |
| D364,338 S | 11/1995 | Cline | |
| 5,479,752 A | 1/1996 | Menegoli | |
| 5,482,234 A | 1/1996 | Lyon | |
| 5,483,772 A | 1/1996 | Haddock | |
| 5,483,782 A | 1/1996 | Hall | |
| 5,491,931 A | 2/1996 | Haddock | |
| 5,497,591 A | 3/1996 | Nelson | |
| 5,522,185 A | 6/1996 | Cline | |
| 5,533,839 A | 7/1996 | Shimada | |
| D372,421 S | 8/1996 | Cline | |
| 5,557,903 A | 9/1996 | Haddock | |
| 5,571,338 A | 11/1996 | Kadonome et al. | |
| 5,596,858 A * | 1/1997 | Jordan | E04D 3/362 |
| | | | 52/460 |
| 5,596,859 A | 1/1997 | Horton et al. | |
| 5,598,785 A | 2/1997 | Zaguroli, Jr. | |
| D378,343 S | 3/1997 | Macor | |
| 5,609,326 A | 3/1997 | Stearns et al. | |
| 5,613,328 A | 3/1997 | Alley | |
| 5,640,812 A | 6/1997 | Crowley et al. | |
| 5,647,178 A | 7/1997 | Cline | |
| 5,660,008 A | 8/1997 | Bevilacqua | |
| 5,664,750 A * | 9/1997 | Cohen | F16M 11/041 |
| | | | 248/229.15 |
| D387,443 S | 12/1997 | Blankenbiller | |
| 5,694,721 A | 12/1997 | Haddock | |
| 5,697,197 A | 12/1997 | Simpson | |
| 5,715,640 A | 2/1998 | Haddock | |
| 5,732,513 A * | 3/1998 | Alley | E04D 13/10 |
| | | | 411/432 |
| 5,743,063 A | 4/1998 | Boozer | |
| 5,743,497 A | 4/1998 | Michael | |
| 5,746,029 A | 5/1998 | Ullman | |
| 5,755,824 A | 5/1998 | Blechschmidt et al. | |
| 5,765,310 A | 6/1998 | Gold | |
| 5,765,329 A | 6/1998 | Huang | |
| 5,787,653 A | 8/1998 | Sakai et al. | |
| 5,794,386 A | 8/1998 | Klein | |
| 5,809,703 A | 9/1998 | Kelly | |
| 5,826,379 A | 10/1998 | Curry | |
| 5,826,390 A | 10/1998 | Sacks | |
| 5,828,008 A | 10/1998 | Lockwood et al. | |
| 5,829,723 A * | 11/1998 | Brunner | A61M 5/1413 |
| | | | 248/222.13 |
| 5,842,318 A | 12/1998 | Bass et al. | |
| 5,890,340 A | 4/1999 | Kafarowski | |
| 5,901,507 A | 5/1999 | Smeja et al. | |
| 5,941,931 A | 8/1999 | Ricks | |
| 5,942,046 A | 8/1999 | Kahlfuss et al. | |
| 5,970,586 A | 10/1999 | Demel et al. | |
| 5,983,588 A | 11/1999 | Haddock | |
| 5,994,640 A | 11/1999 | Bansemir et al. | |
| 6,029,415 A | 2/2000 | Culpepper et al. | |
| 6,073,410 A | 6/2000 | Schimpf et al. | |
| 6,073,920 A * | 6/2000 | Colley | B25B 5/067 |
| | | | 269/143 |
| 6,079,678 A * | 6/2000 | Schott | A61G 7/05 |
| | | | 248/125.1 |
| 6,088,979 A | 7/2000 | Neal | |
| 6,095,462 A | 8/2000 | Morgan | |
| 6,099,203 A | 8/2000 | Landes | |
| 6,105,317 A | 8/2000 | Tomiuchi et al. | |
| 6,106,310 A | 8/2000 | Davis et al. | |
| 6,111,189 A | 8/2000 | Garvison et al. | |
| 6,119,317 A | 9/2000 | Pfister | |
| 6,132,070 A | 10/2000 | Vosika et al. | |
| 6,158,180 A | 12/2000 | Edwards | |
| 6,164,033 A * | 12/2000 | Haddock | E04D 13/10 |
| | | | 52/545 |
| 6,182,403 B1 | 2/2001 | Mimura et al. | |
| 6,206,991 B1 | 3/2001 | Starr | |
| 6,223,477 B1 * | 5/2001 | Alley | E04D 13/10 |
| | | | 256/12.5 |
| 6,237,297 B1 | 5/2001 | Paroly | |

(56) References Cited

U.S. PATENT DOCUMENTS

| | | | |
|---|---|---|---|
| 6,253,496 B1 | 7/2001 | Gilchrist | |
| 6,256,934 B1 | 7/2001 | Alley | |
| 6,269,596 B1 | 8/2001 | Ohtsuka et al. | |
| 6,276,285 B1 | 8/2001 | Ruch | |
| 6,336,616 B1 | 1/2002 | Lin | |
| 6,360,491 B1 | 3/2002 | Ullman | |
| 6,364,262 B1 | 4/2002 | Gibson et al. | |
| 6,364,374 B1 | 4/2002 | Noone et al. | |
| 6,370,828 B1 | 4/2002 | Genschorek | |
| 6,382,569 B1 | 5/2002 | Schattner et al. | |
| 6,385,914 B2 | 5/2002 | Alley | |
| 6,393,796 B1 | 5/2002 | Goettl et al. | |
| 6,453,623 B1 | 9/2002 | Nelson et al. | |
| 6,470,629 B1 | 10/2002 | Haddock | |
| 6,497,080 B1 | 12/2002 | Malcolm | |
| 6,499,259 B1* | 12/2002 | Hockman | E04D 13/10 52/24 |
| 6,508,442 B1 | 1/2003 | Dolez | |
| 6,521,821 B2 | 2/2003 | Makita et al. | |
| 6,536,729 B1 | 3/2003 | Haddock | |
| 6,576,830 B2 | 6/2003 | Nagao et al. | |
| 6,602,016 B2 | 8/2003 | Eckart et al. | |
| 6,622,441 B2 | 9/2003 | Miller | |
| 6,637,671 B2 | 10/2003 | Alley | |
| 6,655,633 B1 | 12/2003 | Chapman, Jr. | |
| 6,665,991 B2 | 12/2003 | Hasan | |
| 6,688,047 B1 | 2/2004 | McNichol | |
| D487,595 S | 3/2004 | Sherman | |
| 6,715,256 B1 | 4/2004 | Fischer | |
| 6,718,718 B2 | 4/2004 | Haddock | |
| 6,725,623 B1 | 4/2004 | Riddell et al. | |
| 6,732,982 B1 | 5/2004 | Messinger | |
| 6,751,919 B2 | 6/2004 | Calixto | |
| D495,595 S | 9/2004 | Dressler | |
| D496,738 S | 9/2004 | Sherman | |
| 6,799,742 B2 | 10/2004 | Nakamura et al. | |
| 6,834,466 B2 | 12/2004 | Trevorrow et al. | |
| 6,918,217 B2 | 7/2005 | Jakob-Bamberg et al. | |
| 6,918,727 B2 | 7/2005 | Huang | |
| 6,922,948 B2 | 8/2005 | Smeja et al. | |
| 6,967,278 B2 | 11/2005 | Hatsukaiwa et al. | |
| 7,012,188 B2 | 3/2006 | Erling | |
| 7,013,612 B2* | 3/2006 | Haddock | E04D 3/3608 52/545 |
| 7,063,763 B2 | 6/2006 | Chapman, Jr. | |
| 7,100,338 B2 | 9/2006 | Haddock | |
| 7,104,020 B1 | 9/2006 | Suttle | |
| 7,127,852 B1* | 10/2006 | Dressler | E04D 13/10 52/24 |
| 7,191,794 B2 | 3/2007 | Hodges | |
| 7,195,513 B1 | 3/2007 | Gherardini | |
| 7,219,863 B1 | 5/2007 | Collett, II | |
| 7,240,770 B2* | 7/2007 | Mullins | E04G 21/3261 182/3 |
| 7,260,918 B2 | 8/2007 | Liebendorfer | |
| 7,281,695 B2* | 10/2007 | Jordan | F16B 2/065 248/274.1 |
| 7,386,922 B1* | 6/2008 | Taylor | E04D 13/10 24/525 |
| 7,406,924 B1* | 8/2008 | Impey | E02B 3/068 114/263 |
| 7,410,139 B1* | 8/2008 | Rohrich | F16B 2/065 248/302 |
| 7,431,252 B2* | 10/2008 | Birli | F16B 2/065 248/221.11 |
| 7,435,134 B2 | 10/2008 | Lenox | |
| 7,451,573 B2 | 11/2008 | Orszulak et al. | |
| 7,458,555 B2* | 12/2008 | Mastropaolo | A47B 23/02 248/160 |
| 7,459,196 B2 | 12/2008 | Sturm | |
| 7,469,511 B2 | 12/2008 | Wobber | |
| 7,493,730 B2 | 2/2009 | Fennell, Jr. | |
| 7,513,080 B1* | 4/2009 | Showalter | E04D 13/10 403/373 |
| 7,516,580 B2 | 4/2009 | Fennell, Jr. | |
| 7,578,711 B2 | 8/2009 | Robinson | |
| 7,600,349 B2 | 10/2009 | Liebendorfer | |
| 7,658,356 B1 | 2/2010 | Nehls | |
| 7,686,625 B1 | 3/2010 | Dyer et al. | |
| 7,703,256 B2* | 4/2010 | Haddock | F16B 5/0004 52/24 |
| 7,707,800 B2 | 5/2010 | Kannisto | |
| 7,731,138 B2* | 6/2010 | Wiesner | A61M 5/1415 248/160 |
| 7,758,011 B2* | 7/2010 | Haddock | E04F 13/0821 248/500 |
| 7,766,292 B2 | 8/2010 | Liebendorfer | |
| 7,780,472 B2 | 8/2010 | Lenox | |
| 7,788,874 B2 | 9/2010 | Miller | |
| 7,788,879 B2 | 9/2010 | Brandes et al. | |
| 7,824,191 B1 | 11/2010 | Browder | |
| 7,827,920 B2 | 11/2010 | Beck et al. | |
| 7,845,127 B2 | 12/2010 | Brescia | |
| 7,847,181 B2 | 12/2010 | Brescia | |
| 7,861,480 B2 | 1/2011 | Wendelburg et al. | |
| 7,874,117 B1 | 1/2011 | Simpson | |
| 7,891,618 B2* | 2/2011 | Carnevali | A47B 21/0314 248/228.5 |
| 7,915,519 B2 | 3/2011 | Kobayashi | |
| 7,926,777 B2 | 4/2011 | Koesema, Jr. | |
| 7,954,287 B2 | 6/2011 | Bravo et al. | |
| 8,011,153 B2 | 9/2011 | Orchard | |
| 8,066,200 B2 | 11/2011 | Hepner et al. | |
| 8,092,129 B2 | 1/2012 | Wiley et al. | |
| 8,096,503 B2 | 1/2012 | Verweyen | |
| 8,109,048 B2 | 2/2012 | West | |
| 8,146,299 B2 | 4/2012 | Stearns et al. | |
| 8,151,522 B2 | 4/2012 | Stearns et al. | |
| 8,153,700 B2 | 4/2012 | Stearns et al. | |
| D658,977 S | 5/2012 | Riddell et al. | |
| 8,226,061 B2 | 7/2012 | Nehls | |
| 8,272,172 B2* | 9/2012 | Li | F24J 2/5205 248/237 |
| 8,294,026 B2 | 10/2012 | Wang et al. | |
| 8,312,678 B1 | 11/2012 | Haddock | |
| 8,316,590 B2 | 11/2012 | Cusson | |
| 8,316,621 B2 | 11/2012 | Safari Kermanshahi et al. | |
| 8,344,239 B2 | 1/2013 | Plaisted | |
| 8,347,572 B2 | 1/2013 | Piedmont | |
| 8,375,654 B1 | 2/2013 | West et al. | |
| 8,387,319 B1 | 3/2013 | Gilles-Gagnon et al. | |
| 8,407,895 B2 | 4/2013 | Hartelius et al. | |
| 8,430,372 B2 | 4/2013 | Haddock | |
| 8,448,405 B2 | 5/2013 | Schaefer et al. | |
| 8,453,986 B2 | 6/2013 | Schnitzer | |
| 8,458,967 B2 | 6/2013 | Kalkanoglu et al. | |
| 8,495,997 B1 | 7/2013 | Laubach | |
| 8,505,254 B2 | 8/2013 | Welter et al. | |
| 8,528,888 B2 | 9/2013 | Header | |
| 8,584,424 B2* | 11/2013 | Smith | E04D 3/28 52/581 |
| 8,627,617 B2 | 1/2014 | Haddock et al. | |
| D699,176 S | 2/2014 | Salomon et al. | |
| 8,640,402 B1 | 2/2014 | Bilge | |
| 8,656,649 B2 | 2/2014 | Haddock | |
| 8,701,354 B2 | 4/2014 | Stearns et al. | |
| 8,752,338 B2 | 6/2014 | Schaefer et al. | |
| 8,756,870 B2 | 6/2014 | Teller et al. | |
| 8,770,885 B2* | 7/2014 | Myers | F16B 2/12 403/374.3 |
| 8,782,983 B2 | 7/2014 | Stearns | |
| 8,826,618 B2 | 9/2014 | Stearns | |
| 8,829,330 B2 | 9/2014 | Meyer et al. | |
| 8,839,573 B2 | 9/2014 | Cusson et al. | |
| 8,844,234 B2* | 9/2014 | Haddock | E04F 13/0821 52/463 |
| 8,888,431 B2 | 11/2014 | Haney | |
| 8,894,424 B2 | 11/2014 | DuPont | |
| 8,910,928 B2* | 12/2014 | Header | E04D 13/10 269/91 |
| 8,925,263 B2 | 1/2015 | Haddock et al. | |
| 8,966,833 B2 | 3/2015 | Ally | |

(56) References Cited

U.S. PATENT DOCUMENTS

| | | |
|---|---|---|
| 9,003,728 B2 | 4/2015 | Asci |
| 9,011,034 B2 | 4/2015 | Liu |
| 9,065,191 B2 | 6/2015 | Martin et al. |
| 9,085,900 B2 | 7/2015 | Haddock |
| 9,086,185 B2 | 7/2015 | Haddock |
| 9,127,451 B1 | 9/2015 | Boor |
| 9,134,044 B2 | 9/2015 | Stearns et al. |
| 9,147,785 B2 | 9/2015 | Haddock et al. |
| D740,113 S | 10/2015 | Olenick |
| 9,200,456 B2 | 12/2015 | Murphy |
| 9,222,263 B2 | 12/2015 | Haddock |
| 9,306,490 B2 | 4/2016 | Haddock et al. |
| 9,447,988 B2 | 9/2016 | Stearns et al. |
| 9,530,916 B2 | 12/2016 | Haddock et al. |
| 9,534,390 B2 | 1/2017 | Pendley et al. |
| 9,608,559 B2 | 3/2017 | Haddock et al. |
| 9,611,652 B2 | 4/2017 | Haddock et al. |
| 9,647,433 B2 | 5/2017 | Meine |
| 9,714,670 B2 * | 7/2017 | Header ............ E04D 13/10 |
| 9,722,532 B2 | 8/2017 | Almy |
| 9,732,512 B2 | 8/2017 | Haddock |
| 9,850,661 B2 * | 12/2017 | Kovacs ............ E04D 13/10 |
| 9,920,958 B2 | 3/2018 | Haddock et al. |
| 9,926,706 B2 | 3/2018 | Hockman |
| 10,053,856 B2 | 8/2018 | Haddock |
| 10,054,336 B2 | 8/2018 | Haddock et al. |
| 10,077,562 B2 | 9/2018 | Haddock et al. |
| 10,103,682 B2 | 10/2018 | Haddock et al. |
| 10,106,987 B2 | 10/2018 | Haddock et al. |
| 10,385,573 B2 * | 8/2019 | Van Leuven ....... E01H 5/102 |
| 2002/0026765 A1 | 3/2002 | Vahey |
| 2002/0088196 A1 * | 7/2002 | Haddock ........... E04D 3/3608 52/543 |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 * | 3/2004 | Showalter ........ E04D 13/10 52/223.13 |
| 2004/0164208 A1 | 8/2004 | Nielson et al. |
| 2004/0231949 A1 | 11/2004 | Le et al. |
| 2004/0237465 A1 | 12/2004 | Refond |
| 2005/0102958 A1 | 5/2005 | Anderson |
| 2005/0115176 A1 | 6/2005 | Russell |
| 2005/0210769 A1 | 9/2005 | Harvey |
| 2005/0257434 A1 * | 11/2005 | Hockman ........... E04D 13/10 52/24 |
| 2006/0065805 A1 * | 3/2006 | Barton ............ B25B 5/101 248/317 |
| 2006/0075691 A1 | 4/2006 | Verkamlp |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0230205 A1 | 9/2009 | Hepner et al. |
| 2009/0320826 A1 | 12/2009 | Kufner |
| 2010/0058701 A1 | 3/2010 | Yao et al. |
| 2010/0133040 A1 * | 6/2010 | London ............ A62B 1/04 182/3 |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0293874 A1 | 11/2010 | Liebendorfer |
| 2010/0314517 A1 * | 12/2010 | Patzer ............ A61M 5/1415 248/230.3 |
| 2011/0078892 A1 | 4/2011 | Hartelius et al. |
| 2011/0120047 A1 | 5/2011 | Stearns et al. |
| 2011/0154750 A1 | 6/2011 | Welter et al. |
| 2011/0174360 A1 | 7/2011 | Plaisted et al. |
| 2011/0209745 A1 | 9/2011 | Korman |
| 2011/0214365 A1 | 9/2011 | Aftanas |
| 2011/0214388 A1 * | 9/2011 | London ............ E04G 21/32 52/745.21 |
| 2011/0239546 A1 | 10/2011 | Tsuzuki et al. |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0102853 A1 | 5/2012 | Rizzo |
| 2012/0153108 A1 | 6/2012 | Schneider |
| 2012/0167364 A1 | 7/2012 | Koch et al. |
| 2012/0192519 A1 | 8/2012 | Ray |
| 2012/0193310 A1 | 8/2012 | Fluhrer et al. |
| 2012/0244729 A1 | 9/2012 | Rivera et al. |
| 2012/0248271 A1 | 10/2012 | Zeilenga |
| 2012/0267490 A1 * | 10/2012 | Haddock ........... H02S 20/00 248/221.11 |
| 2012/0298188 A1 | 11/2012 | West et al. |
| 2012/0299233 A1 * | 11/2012 | Header ............ E04D 13/10 269/91 |
| 2012/0325761 A1 | 12/2012 | Kubsch et al. |
| 2013/0048056 A1 | 2/2013 | Kilgore et al. |
| 2013/0168525 A1 | 7/2013 | Haddock |
| 2013/0263917 A1 | 10/2013 | Hamamura |
| 2013/0313043 A1 | 11/2013 | Lallier |
| 2013/0340358 A1 | 12/2013 | Danning |
| 2014/0003861 A1 | 1/2014 | Cheung |
| 2014/0041202 A1 | 2/2014 | Schnitzer et al. |
| 2014/0069048 A1 | 3/2014 | Ally |
| 2014/0096462 A1 | 4/2014 | Haddock |
| 2014/0179133 A1 | 6/2014 | Redel |
| 2014/0283467 A1 | 9/2014 | Chabas et al. |
| 2015/0060620 A1 | 3/2015 | Smeja |
| 2015/0107168 A1 | 4/2015 | Kobayashi |
| 2015/0200620 A1 | 7/2015 | Haddock et al. |
| 2016/0025262 A1 | 1/2016 | Stearns et al. |
| 2016/0060869 A1 * | 3/2016 | Smeja ............. E04D 13/00 52/701 |
| 2016/0111998 A1 | 4/2016 | Schmid |
| 2016/0160524 A1 * | 6/2016 | Malins ............ A01K 3/00 248/217.4 |
| 2017/0067258 A1 | 3/2017 | Stearns et al. |
| 2018/0031279 A1 | 2/2018 | Haddock et al. |
| 2018/0119423 A1 | 5/2018 | Haddock |
| 2019/0226214 A1 * | 7/2019 | Van Leuven ....... E04D 3/40 |
| 2019/0273460 A1 * | 9/2019 | Kovacs ........... H02S 20/10 |
| 2019/0330853 A1 * | 10/2019 | Van Leuven ....... E04D 13/10 |

FOREIGN PATENT DOCUMENTS

| | | |
|---|---|---|
| AT | 298762 | 5/1972 |
| AU | 2005201707 | 11/2006 |
| AU | 2009101276 | 1/2010 |
| AU | 2009245849 | 6/2010 |
| CH | 204783 | 5/1939 |
| CH | 388590 | 2/1965 |

(56) References Cited

FOREIGN PATENT DOCUMENTS

| | | |
|---|---|---|
| CH | 469159 | 2/1969 |
| CH | 671063 | 7/1989 |
| CN | 202025767 | 11/2011 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 10056177 | 5/2002 |
| DE | 10062697 | 7/2002 |
| DE | 10344202 | 4/2004 |
| DE | 202005006951 | 8/2005 |
| DE | 102005002828 | 8/2006 |
| DE | 202006015336 | 12/2006 |
| DE | 202007002252 | 4/2007 |
| DE | 202007018367 | 7/2008 |
| DE | 102007036206 | 2/2009 |
| DE | 202009010984 | 12/2009 |
| DE | 102008032985 | 1/2010 |
| EP | 0481905 | 4/1992 |
| EP | 0952272 | 10/1999 |
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2793827 | 11/2000 |
| FR | 2997169 | 4/2014 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H09-256562 | 9/1997 |
| JP | 2000-179106 | 6/2000 |
| JP | 2000-234423 | 8/2000 |
| JP | 2000-303638 | 10/2000 |
| JP | 2001-303724 | 10/2001 |
| JP | 2002-146978 | 5/2002 |
| JP | 2003-096986 | 4/2003 |
| JP | 2003-155803 | 5/2003 |
| JP | 2004-060358 | 2/2004 |
| JP | 2004-068270 | 3/2004 |
| JP | 2004-092134 | 3/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2006-097291 | 4/2006 |
| JP | 2011-069130 | 4/2011 |
| JP | 2011-236611 | 11/2011 |
| KR | 100957530 | 5/2010 |
| WO | WO 96/30606 | 10/1996 |
| WO | WO 97/08399 | 3/1997 |
| WO | WO 99/55982 | 11/1999 |
| WO | WO 03/098126 | 11/2003 |
| WO | WO 2008/021714 | 2/2008 |
| WO | WO 2010/140878 | 12/2010 |
| WO | WO 2011/019460 | 2/2011 |
| WO | WO 2012/014203 | 2/2012 |
| WO | WO 2012/017711 | 2/2012 |
| WO | WO 2012/048056 | 4/2012 |
| WO | WO 2013/009375 | 1/2013 |

OTHER PUBLICATIONS

"Aluminum," Wikipedia, Jul. 3, 2016, 21 pages [retrieved Oct. 3, 2017 from: en.wikipedia.org/w1ki/Aluminium].
"ClampFit-H Product Sheet," Schletter GmbH, Kirchdorf, Germany, Nov. 2015, 2 pages.
"Oil Canning—Solutions," Pac-Clad, 2001, 2 pages [retrieved online from: pac-clad.com/aiapresentation/sld021.htm].
"Oil Canning," Metal Construction Association, 2003, Technical Bulletin #95-1060, 2 pages.
"Snowbar(TM)—The Ultimate in Snow Retention for Standing Seam Roofs," Riddell & Company, Inc., 2011, 7 pages [retrieved online from: snobar.com].
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
International Search Report and Written Opinion for International (PCT) Patent Application No. PCT/US2012/070653, dated May 31, 2013 11 pages.
International Preliminary Report on Patentability for International (PCT) Patent Application No. PCT/US2012/070653, dated Jul. 10, 2014 8 pages.
Official Action for U.S. Appl. No. 13/720,461, dated May 23, 2014 19 pages.
Official Action for U.S. Appl. No. 13/720,461, dated Oct. 8, 2015 23 pages.
Official Action for U.S. Appl. No. 13/720,461, dated May 19, 2016 20 pages.
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].
"New 'Alzone 360 system'", Arrid, 2008, 34 pages [retrieved online from: https://web.archive.org/web/20120317120735/www.arrid.com.au/?act=racking_parts].
"REES-Snow Retention Systems," Weerbewind, 2010, 3 pages [retrieved online from: https://web.archive.org/web/20100310075027/www.rees-oberstdorf.de/en/products/snow-retention-system.html].
"Solar mount. System," Schletter GmbH, 2012, 1 page [retrieved online from: https://web.archive.org/web/20120316154604/www.schletter.de/152-1-Solar-mounting-systems.html].
Ideematec Tracking & Mounting Systems [online], Apr. 2008, [retrieved Mar. 6, 2012], Retrieved from http://www.ideematec.de.
U.S. Appl. No. 14/257,747, filed Apr. 21, 2014 now U.S. Pat. No. 9,085,900.
U.S. Appl. No. 14/789,607, filed Jul. 1, 2015 now U.S. Pat. No. 9,732,512.
U.S. Appl. No. 15/471,179, filed Mar. 28, 2017 now U.S. Pat. No. 10,053,856.
U.S. Appl. No. 15/663,081, filed Jul. 28, 2017.
U.S. Appl. No. 15/798,023, filed Oct. 30, 2017.
U.S. Appl. No. 16/360,923, filed Mar. 21, 2019.
U.S. Appl. No. 13/720,461, filed Dec. 19, 2012.

(56) References Cited

OTHER PUBLICATIONS

U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018.
U.S. Appl. No. 08/383,477, filed Feb. 2, 1995.
U.S. Appl. No. 08/285,280, filed Aug. 1, 1994 now U.S. Pat. No. 5,557,903.
U.S. Appl. No. 07/912,845, filed Jul. 13, 1992 now U.S. Pat. No. 5,228,248.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1999 now U.S. Pat. No. 6,164,033.
U.S. Appl. No. 09/698,358, filed Oct. 27, 2000.
U.S. Appl. No. 10/118,057, filed Apr. 8, 2002 now U.S. Pat. No. 6,718,718.
U.S. Appl. No. 10/824,320, filed Apr. 13, 2004.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999 now U.S. Pat. No. 6,470,629.
U.S. Appl. No. 09/758,805, filed Jan. 11, 2001.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004.
U.S. Appl. No. 10/823,410, filed Apr. 13, 2004 U.S. Pat. No. 7,703,256.
U.S. Appl. No. 12/767,983, filed Apr. 27, 2010.
U.S. Appl. No. 12/960,679, filed Dec. 6, 2010.
U.S. Appl. No. 11/325,704, filed Jan. 5, 2006.
U.S. Appl. No. 11/425,338, filed Jun. 20, 2006.
U.S. Appl. No. 12/707,724, filed Feb. 18, 2010.
U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013.
U.S. Appl. No. 14/697,387, filed Apr. 27, 2015
U.S. Appl. No. 12/629,179, filed Dec. 2, 2009.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014.
U.S. Appl. No. 14/500,919, filed Sep. 29, 2014 now U.S. Pat. No. 9,611,652.
U.S. Appl. No. 15/452,388, filed Mar. 7, 2017.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018.
U.S. Appl. No. 14/030,615, filed Sep. 18, 2013.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015 now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.
U.S. Appl. No. 13/712,474, filed Dec. 12, 2012 now U.S. Pat. No. 8,844,234.
U.S. Appl. No. 14/469,153, filed Aug. 26, 2014.
U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.

* cited by examiner

MOUNTING DEVICE FOR NAIL STRIP PANELS

CROSS-REFERENCE TO RELATED APPLICATIONS

This patent application is a continuation of U.S. patent application Ser. No. 13/720,461, filed on Dec. 19, 2012, which claims the benefit of U.S. Provisional Patent Application Ser. No. 61/581,305, Dec. 29, 2011. The entire disclosure of each application set forth in this Cross-Reference to Related Applications section is hereby incorporated by reference.

FIELD OF THE INVENTION

The present invention generally relates to mounting devices and, more particularly, to mounting devices that may be used with nail strip panels.

BACKGROUND

Metal panels are being increasingly used to define building surfaces such as roofs and sidewalls. One type of metal panel is a standing seam panel, where portions of adjacent standing seam panels of the building surface are interconnected/nested in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that increasing the number of locations where a metal panel building surface is punctured may increase the potential for leakage and/or corrosion.

SUMMARY

A first aspect of the present invention is directed to a mounting device that is adapted for installation on a standing seam of a panel assembly. This mounting device includes a mounting body. A slot extends into this mounting body and is defined by first slot sidewall, a second slot sidewall, and a slot base, where the first and second slot sidewalls are disposed in non-parallel relation to one another (i.e., the first slot sidewall is not parallel to the second slot sidewall), and where the first and second slot sidewalls are always maintained in a fixed position relative to one another (e.g., the position/orientation of the first and second slot sidewalls is not adjustable). At least one seam fastener may be extended through the mounting body and into the slot (e.g., to retain a standing seam within the slot). At least one mounting fastener may be extended at least into the mounting body (e.g., to mount one or more attachments to the mounting body).

A number of feature refinements and additional features are applicable to the first aspect of the present invention. These feature refinements and additional features may be used individually or in any combination. The following discussion is applicable to the first aspect, up to the start of the discussion of a second aspect of the present invention.

The mounting body may be of one-piece construction. For instance, the mounting body may be of an integral construction (e.g., an extruded part). The mounting body may be characterized as lacking any joints of any kind. Each portion of the mounting body may be characterized as always being maintained in a fixed position relative to a remainder of the mounting body (e.g., by having the mounting body be of one-piece construction; such that the mounting body itself includes no separable parts). The mounting body may be formed from any appropriate material or combination of materials (e.g., a metal alloy).

The first and second slot sidewalls may each include at least one flat or planar section. The entirety of the second slot sidewall may be in the form of a single flat/planar surface. The first slot sidewall may include a first nose or projection that extends in a direction in which the second slot sidewall is spaced from the first slot sidewall. However, this first nose does not extend all the way to the second slot sidewall (e.g., to provide a continual opening to the slot; such that the mounting body may be positioned over/onto a standing seam of a panel assembly via the noted slot). A recess or depression may be incorporated on the first slot sidewall in alignment with each seam fastener that extends through the second slot sidewall and into the slot. Other than any such first nose and/or recess(s), the remainder of the first slot sidewall may be in the form of a single flat/planar surface.

The second slot sidewall may include a second nose or projection that extends in a direction in which the first slot sidewall is spaced from the second slot sidewall. However, this second nose does not extend all the way to the first slot sidewall (e.g., to provide a continual opening to the slot; such that the mounting body may be positioned over/onto a standing seam of a panel assembly via the noted slot). Other than this second nose, the remainder of the second slot sidewall may be in the form of a single flat/planar surface. In the case where the first slot sidewall includes the noted first nose and where the second slot sidewall includes the noted second nose, each such nose may define the lowermost extreme of the corresponding slot sidewall when the depth dimension of the slot coincides with the vertical dimension, and the first nose (first slot sidewall) may be disposed at a lower elevation than the second nose (second slot sidewall).

A first included angle may exist between the slot base and the first slot sidewall. A second included angle may exist between the slot base and the second slot sidewall. The magnitudes of the first and second included angles may be different from one another. The magnitude of the first included angle may be larger than the magnitude of the second included angle. In one embodiment, the first included angle is greater than 90° while the second included angle is at least substantially 90°. One embodiment has this first included angle being within a range of about 100° to about 110°. Another embodiment has this first included angle being about 105°.

Consider the case where a reference plane extends in the depth dimension of the slot (e.g., so as to intersect the slot base and be disposed between and in spaced relation to each of the first and second slot sidewalls). The first slot sidewall may be characterized as extending both away from the slot base and away from this reference plane (e.g., the first slot sidewall may diverge from this reference plane when proceeding away from the slot base), while the second slot sidewall may be characterized as extending away from the slot base in at least substantially parallel relation to this reference plane.

The spacing between the first and second slot sidewalls may progressively increase when proceeding away from the slot base. The spacing between the first and second slot sidewalls may progressively and continually increase proceeding away from the slot base until reaching one of the above-noted noses, where the spacing between the first and second slot sidewalls would be then be reduced.

The first and second slot sidewalls may be characterized as terminating at different elevations when a depth dimension of the slot coincides with a vertical dimension. The "side" of the mounting body that incorporates the first slot sidewall may be characterized as being "taller" than the "side" of the mounting body that incorporates the second slot sidewall when a depth dimension of the slot coincides with a vertical dimension.

The first slot sidewall may be characterized as extending from the slot base to a first edge (where the above-noted first nose may define/include this first edge), while the second slot to sidewall may be characterized as extending from the slot base to a second edge (where the above-noted second nose may define/include this second edge). In one embodiment, the first edge of the first slot sidewall is spaced from the slot base by a first distance when measured in a first dimension that is orthogonal to the slot base, while the second edge of the second slot sidewall is spaced from the slot base by a second distance when measured in this same first dimension, where the second distance is less than the first distance. In one embodiment, the first edge of the first slot sidewall is spaced a first distance from a reference plane that contains at least a substantial portion of an upper surface of the mounting body (when measured in a first dimension that is orthogonal to this reference plane), while the second edge of the second slot sidewall is spaced a second distance from this same reference plane (when measured in this same first dimension), where the second distance is less than the first distance. The noted "first dimension" may correspond with the vertical dimension when the depth dimension of the slot coincides with this vertical dimension.

The mounting body may include an upper surface and an oppositely disposed lower surface, where the upper surface includes at least one flat section, and where the lower surface incorporates the above-noted slot (e.g., the depth dimension of the slot may be characterized as proceeding in the direction of this upper surface of the mounting body, where the slot base is spaced from the upper surface of the mounting body such that the slot does not extend entirely through the mounting body). The first slot sidewall may be characterized as extending from the slot base and at least generally away from the second slot sidewall, while the second slot sidewall may be characterized as being oriented at least substantially orthogonal to a reference plane that contains the noted flat section(s) of the upper surface (this reference plane could contain at least a substantial portion of the upper surface of the mounting body). Such a first slot sidewall may include the above-noted first nose, where this first nose is spaced further from the slot base than a remainder of the first slot sidewall.

A second aspect of the present invention is directed to a mounting device that is adapted for installation on a standing seam of a panel assembly. This mounting device includes a one-piece mounting body (e.g., such that the mounting body itself includes no separable parts) having an upper surface and an oppositely disposed lower surface, where the upper surface includes at least one flat section, and where the lower surface incorporates a slot. This slot extends into the mounting body and is defined by first slot sidewall, a second slot sidewall, and a slot base that extends between the first and second slot sidewalls. The first slot sidewall extends from the base and at least generally away from the second slot sidewall until reaching a first nose or projection, which then extends back in a direction that the second slot sidewall is spaced from the first slot sidewall. The second slot sidewall is oriented at least substantially orthogonal to a reference plane that contains the noted flat section(s) of the upper surface (at least a substantial portion of the upper surface of the mounting body could be contained within this reference plane). The first nose of the first slot sidewall may be disposed at a lower elevation than a lowermost edge of the second slot sidewall when the noted reference plane associated with the flat section(s) of the upper surface is horizontally disposed and further is disposed vertically above the slot base. At least one seam fastener may be extended through the mounting body and into the slot (e.g., to retain a standing seam within the slot). At least one mounting fastener may be extended into the mounting body (e.g., to mount one or more attachments to the mounting body).

The various features of the mounting device of the first aspect may be used in conjunction with the second aspect, individually or in any combination.

The mounting devices of each of the first and second aspects may be used in conjunction with a panel assembly defined by a plurality of nail strip panels. Each such nail strip panel may include a first seam rib and a second seam rib. Nesting the first seam rib on one nail strip panel with the second seam rib of another nail strip panel defines a standing seam. At least an upper portion of this standing seam may be received in the slot of the above-noted types of mounting devices. A lower portion of such a seam may include a recess, and the above-noted nose on the first slot sidewall may extend into this recess (e.g., to provide resistance to a "lifting off" of the mounting device relative to the standing seam).

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that the mounting device includes "a seam fastener" alone does not mean that the mounting device includes only a single seam fastener). Moreover, any failure to use phrases such as "at least one" also does not limit the corresponding feature to the singular (e.g., indicating that a mounting device includes "a seam fastener" alone does not mean that the mounting device includes only a single seam fastener). Use of the phrase "at least generally" or the like in relation to a particular feature encompasses the corresponding characteristic and insubstantial variations thereof (e.g., indicating that a surface is at least generally flat encompasses the surface being flat). Finally, a reference of a feature in conjunction with the phrase "in one embodiment" does not limit the use of the feature to a single embodiment.

DETAILED DESCRIPTION

Figure 1:
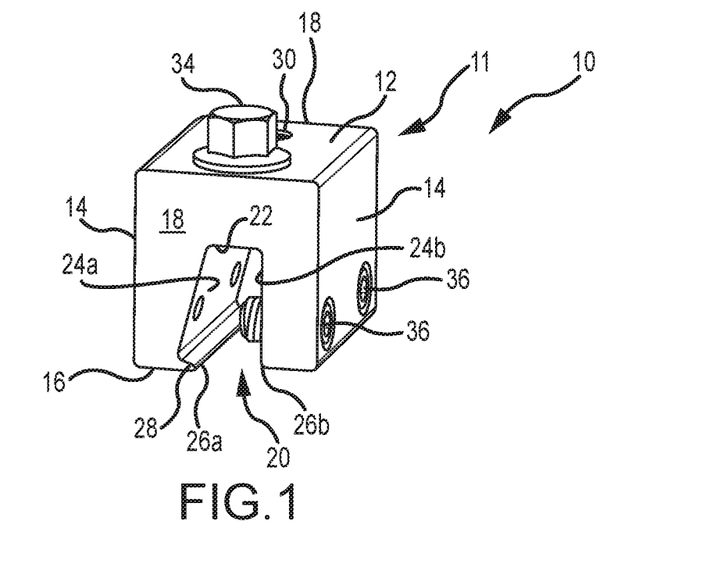
FIG. 1 is a perspective view of one embodiment of a mounting device for use with nail strip panels.
Figure 2:
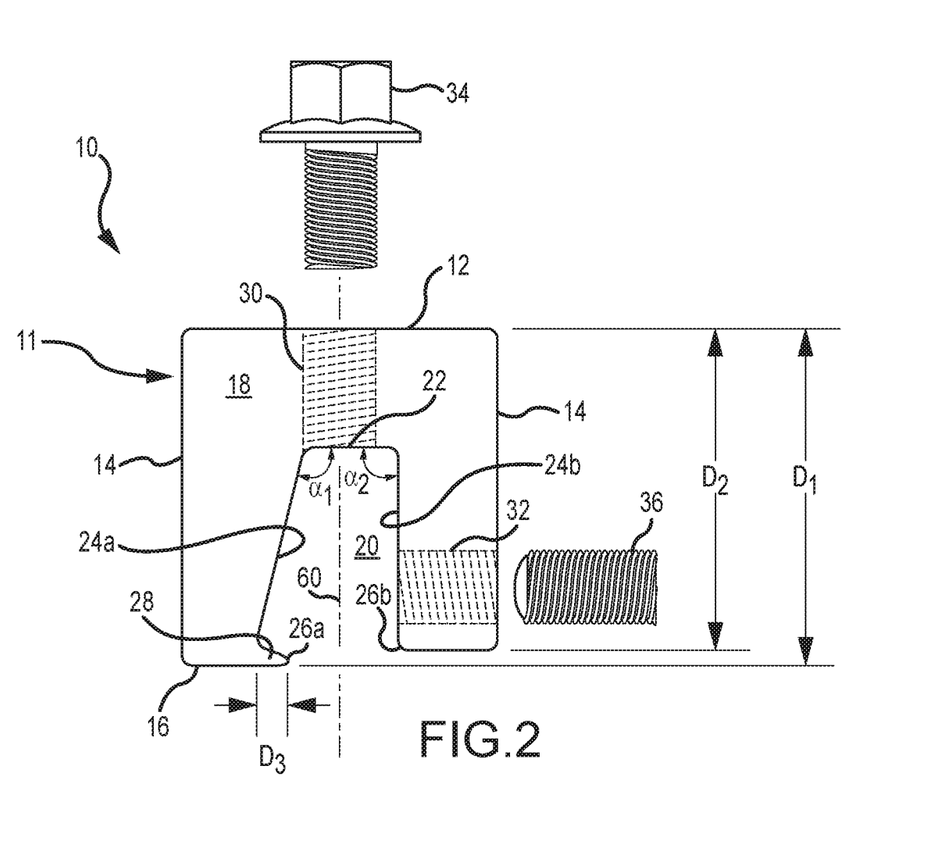
FIG. 2 is an end view of the mounting device of FIG. 1.

One embodiment of a mounting device is illustrated in FIGS. 1 and 2, and is identified by reference numeral 10. This mounting device 10 is in the form of a mounting body 11, at least one mounting fastener 34, and at least one seam fastener 36. The mounting body 11 may be of one-piece construction (e.g., an extruded part). The mounting body 11 may be characterized as lacking any joints of any kind. The mounting body 11 may be configured so as to have no separable parts.

The mounting body 11 may be formed from any appropriate material or combination of materials (e.g., a metal alloy), and includes an upper surface 12, an oppositely disposed lower surface 16, a pair of oppositely disposed side surfaces 14, and a pair of oppositely disposed ends 18. The spacing between the ends 18 coincides with a length dimension for the mounting body 11, the spacing between the side surfaces 14 coincides with a width dimension for the mounting body 11, and the spacing between the upper surface 12 and lower surface 16 coincides with a height or depth dimension for the mounting body 11 (as well as for slot 20, discussed below).

The upper surface 12 of the mounting body 11 includes at least one flat section. A substantial portion of the upper surface 12 is flat in the illustrated embodiment—all except the transition between the upper surface 12 and each of the two side surfaces 14, which may be rounded and/or chamfered. A single reference plane may contain at least a substantial portion of the upper surface 12 of the mounting body 11. In any case, typically the mounting device 10 will be installed on a panel assembly such that its upper surface 12 projects at least generally upwardly to accommodate supporting one or more attachments that may be appropriately secured to the mounting body 11. In this regard, the upper surface 12 may include at least one threaded hole 30 on a flat section thereof (two in the illustrated embodiment; any appropriate number of threaded holes 30 may be utilized; multiple threaded holes 30 typically being spaced along the length dimension of the mounting body 11) for receiving a corresponding mounting fastener 34 (e.g., the mounting fastener 34 may be threaded into a pre-defined threaded hole 30 on a flat section of the upper surface 12 and that extends into the mounting body 11). Another option is for the mounting fastener 34 to be self-tapping (i.e., so as to not require a threaded hole in the mounting body 11 prior to initially installing the mounting fastener 34 on the mounting body 11).

The lower surface 16 of the mounting body 11 includes a slot 20 that extends between the two ends 18 of the mounting body 11, and it is located between the pair of side surfaces 14 of the mounting body 11. This slot 20 is defined by a slot base 22 and a pair of slot sidewalls 24a, 24b. The slot sidewalls 24a, 24b are spaced apart to receive at least an end section of a standing seam of a panel assembly (e.g., standing seam 52 of panel assembly 40, discussed below in relation to FIGS. 3 and 4). As the mounting body 11 is of one-piece construction, the first slot sidewall 24a is always maintained in a fixed position relative to the second slot sidewall 24b.

Each of the slot sidewalls 24a, 24b includes at least one flat section. In the illustrated embodiment, the entirety of the second slot sidewall 24b is flat or planar, while the entirety of the first slot sidewall 24a is also flat or planar other than for a nose or projection 28 located at a lower extreme thereof and for optional depressions or recesses (where each such recess is axially aligned with a seam fastener 36). Any such nose or projection 28 extends at least generally in the direction that the second slot sidewall 24b is spaced from the first slot sidewall 24a.

At least one threaded hole 32 (two in the illustrated embodiment; any appropriate number of threaded holes 32 may be utilized; multiple threaded holes 32 typically being spaced along the length dimension of the body 11) may extend from one of the side surfaces 14, through the body 11, and intersects the first slot sidewall or the second slot sidewall 24b. In the illustrated embodiment, the threaded hole(s) 32 intersect with the second slot sidewall 24b (e.g., it may be that no threaded holes 32 extend through the mounting body 11 to intersect with the first slot sidewall 24a).

An appropriate seam fastener 36 may be directed through a given threaded hole 32 of the mounting device 10 so as to extend into the slot 20 to engage a standing seam and secure the same against the opposing slot sidewall 24a or 24b (the first slot sidewall 24a in the illustrated embodiment). A cavity of any appropriate type may be included on this opposing slot sidewall 24a or 24b (the first slot sidewall 24a in the illustrated embodiment) to allow the aligned seam fastener 36 to deflect a corresponding portion of the standing seam into this cavity, although such may not be required in all instances. In any case and in one embodiment, the seam fastener 34 only interfaces with an exterior surface of a standing seam disposed in the slot 20. For instance, the end of the seam fastener 36 that interfaces with such a standing seam may be convex, rounded, or of a blunt-nosed configuration to provide a desirable interface with this standing seam (e.g., non-penetrating). Another option is for the seam fastener(s) 36 to be self-tapping (i.e., so as to not require a threaded hole prior to initially installing the seam fastener 34 on the body 11).

A number of characterizations may be made in relation to the slot 20 of the mounting device 10, and which may apply individually or in any combination. The first slot sidewall 24a and the second slot sidewall 24b are disposed other than in parallel relation—the first slot sidewall 24a is not parallel to the second slot sidewall 24b. The first slot sidewall 24a and the second slot sidewall 24b may be characterized as being disposed in different orientations.

A first included angle $\alpha_1$ is defined between the slot base 22 and the first slot sidewall 24a (e.g., between a flat section of the slot base 22 and an adjacent flat section of the first slot sidewall 24a). In the illustrated embodiment, this included angle $\alpha_1$ is greater than 90°. A second included angle $\alpha_2$ is defined between the slot base 22 and the second slot sidewall 24b (e.g., between a flat section of the slot base 22 and an adjacent flat section of the second slot sidewall 24b). In the illustrated embodiment, this included angle $\alpha_2$ is at least substantially 90°. The magnitude of the included angle $\alpha_1$ is thereby greater than the magnitude of the included angle $\alpha_2$. One embodiment has the included angle $\alpha_1$ being within a range of about 100° to about 110°. Another embodiment has the included angle $\alpha_1$ being about 105°.

FIG. 2 illustrates a reference plane 60 that extends through the slot 20 at a location that is between the first slot sidewall 24a and the second slot sidewall 24b. The reference plane 60 may be orthogonal to one or more of the slot base 22 and the upper surface 12. The reference plane 60 may extend in the above-noted height or depth dimension for the mounting device 10. One characterization of the configuration of the slot 20 is that the first slot sidewall 24a extends from the slot base 22 and away from the reference plane 60, while the second slot sidewall 24b extends from the slot base 22 at least substantially parallel to this same reference plane 60.

The slot 20 may be characterized as having a variable width, including a continually variable width for at least a substantial portion of its depth (up to the nose 28 of first slot sidewall 24a). The spacing between the first slot sidewall 24a and the second slot sidewall 24b may progressively increase proceeding away from the slot base 22 up to the nose 28 of the first slot sidewall 24a. In one embodiment, the second slot sidewall 24b is disposed orthogonally to at least one of the upper surface 12 and the slot base 22, while the first slot sidewall 24a extends from the slot base 22 at least generally away from the second slot sidewall 24b.

The first slot sidewall 24a and the second slot sidewall 24b may be characterized as terminating at different elevations when the depth of the slot 20 extends in the vertical dimension. The up-and-down dimension in the view presented in FIG. 2 corresponds with this depth dimension for the slot 20. The width dimension of the slot 20 coincides with the spacing between the first slot sidewall 24a and the second slot sidewall 24b. The length dimension of the slot 20 coincides with the spacing between the ends 18 of the mounting body 11. The lower surface 16 at its intersection with the first slot sidewall 26a may be offset in the vertical dimension (when the depth of the slot 20 extends in the vertical dimension) from the lower surface 16 at its intersection with the second slot sidewall 26b.

The first slot sidewall 24a may be characterized as extending from the slot base 22 to a first/lower edge 26a, while the second slot sidewall 24b may be characterized as extending from the slot base 22 to a second/lower edge 26b. In the illustrated embodiment, the nose 28 includes the first edge 26a of the first slot sidewall 24a. The upper surface 12 and the first edge 26a of the first slot sidewall 24a are separated by a distance $D_1$ measured in a first dimension (the vertical dimension in the view presented in FIG. 2, and that is orthogonal to a flat section of the upper surface 12), while the upper surface 12 and the second edge 26b of the second slot sidewall 24b are separated by a distance $D_2$ measured in this same first dimension. As illustrated in FIG. 2, the distance $D_1$ is greater than the distance $D_2$. The spacing between the slot base 22 and the first edge 26a of the first slot sidewall 24a, measured in this same first dimension, is also greater than the spacing between the slot base 22 and the second edge 26b of the second slot sidewall 24b.

Figure 3:
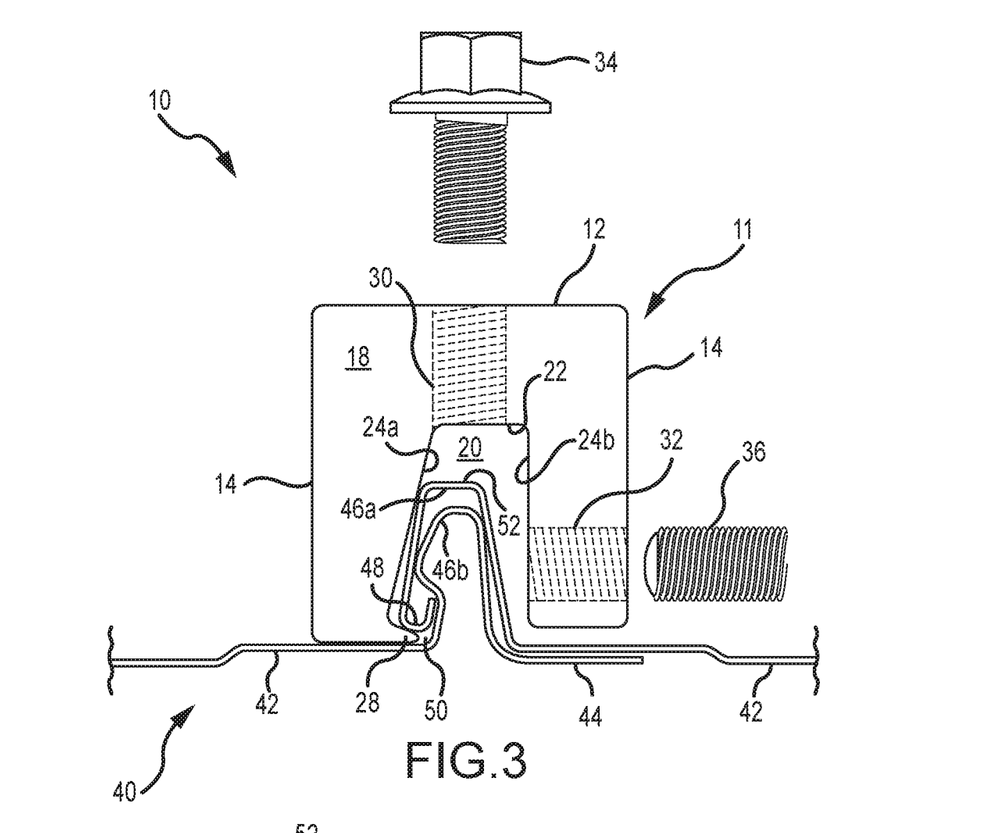
FIG. 3 is an end view of the mounting device of FIG. 1, positioned on a standing seam of a panel assembly defined by multiple nail strip panels of a first configuration.
Figure 4:
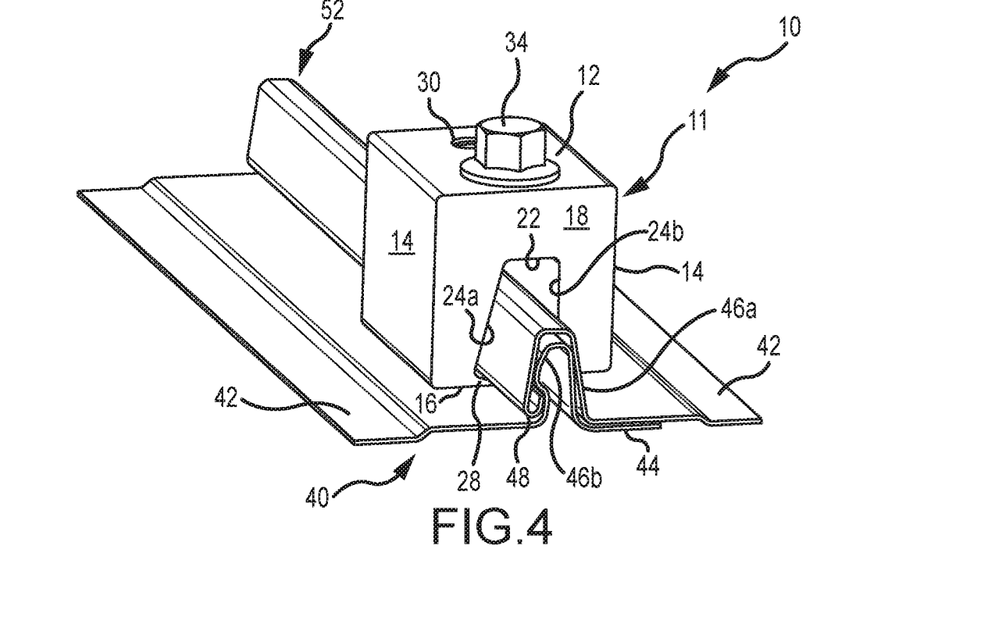
FIG. 4 is a perspective view of the mounting device of FIG. 1, positioned on a standing seam of a panel assembly of the type presented in FIG. 3.

FIGS. 3 and 4 show the mounting device 10 positioned on a standing seam 52 of one embodiment of a panel assembly 40. The panel assembly 40 may be used to define any appropriate surface, including a roofing surface. The panel assembly 40 is defined by a plurality of what are commonly referred to as nail strip panels 42 or the like. Each nail strip panel 42 includes a nail strip flange 44, a left seam rib 46a (a rib used to define a seam 52), and a right seam rib 46b (a rib used to define a seam 52). The left seam rib 46a and right seam rib 46b of a given nail strip panel 42 are spaced in the width dimension of the nail strip panel 42. Each nail strip panel 42 may include one or more flat sections, as well as one or more other structures such as crests, minor ribs, intermediate ribs, pencil ribs, striations, fluting, or flutes.

The left nail strip panel 42 in FIGS. 3 and 4 would be secured to an underlying support structure (e.g., a deck) by extending a plurality of suitable fasteners (e.g., nails, screws) through the nail strip flange 44 (e.g., spaced along the length of the nail strip flange 44—the length dimension extending into the page in the view presented in FIG. 3) and into the underlying support structure. The left seam rib 46a for the right nail strip panel 42 illustrated in FIGS. 3 and 4 may then be positioned over the right seam rib 46b for the left nail strip panel 42 illustrated in FIGS. 3 and 4 to define a standing seam 52. Nail strip panels 42 may be installed in this manner to define a panel assembly 40 of a desired size (both in the length and width dimensions).

Each standing seam 52 of the panel assembly includes a recess 50 on one side thereof (the left side in the views of FIGS. 3 and 4). This recess 50 is defined below an end section 48 of the left seam rib 46a of the standing seam 52, a lower portion of the right seam rib 46b of this same standing seam 52, and a base of the nail strip panel 42 associated with the noted right seam rib 46b. The nose 28 on the lower portion of the first slot sidewall 24a may be directed into this recess 50 so as to be disposed under the end section 48 of the corresponding left seam rib 46a in the view shown in FIG. 3. This provides increased lift-off resistance for the mounting device 10 on this standing seam 52. One embodiment has the nose 28 extending a distance $D_3$ (measured in the width dimension) of at least about 0.1" from the adjacent flat portion of the first slot sidewall 24a. Another embodiment has this distance $D_3$ being at least about 0.15".

Figure 5:
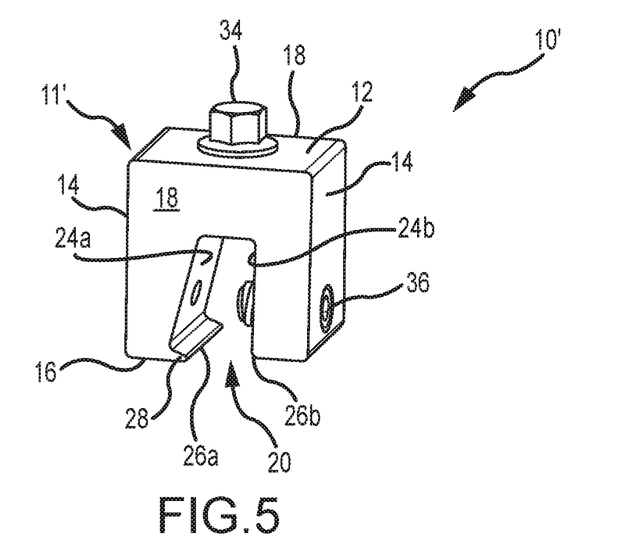
FIG. 5 is a perspective view of another embodiment of a mounting device for nail strip panels.

FIG. 5 illustrates a variation of the mounting device 10 of FIGS. 1-2. Corresponding components are identified by the same reference numeral. Those corresponding components that differ in at least some respect are identified by a "single prime" designation in FIG. 5. One difference between the mounting device 10' of FIG. 5 and the mounting device 10 of FIGS. 1-2 is that the mounting device 10' accommodates a single seam fastener 36 (versus the multiple seam fasteners 36 used by the mounting device 10 of FIGS. 1-2). Another difference is that the mounting device 10' of FIG. 5 accommodates a single mounting fastener 34 (versus the multiple mounting fasteners 34 used by the mounting device 10 of FIGS. 1-2). As such, the mounting body 11' of the mounting device 10' may be characterized as being "shorter" in the length dimension (coinciding with the spacing between the ends 18) than the mounting body 11 of the mounting device 10.

Figure 6:
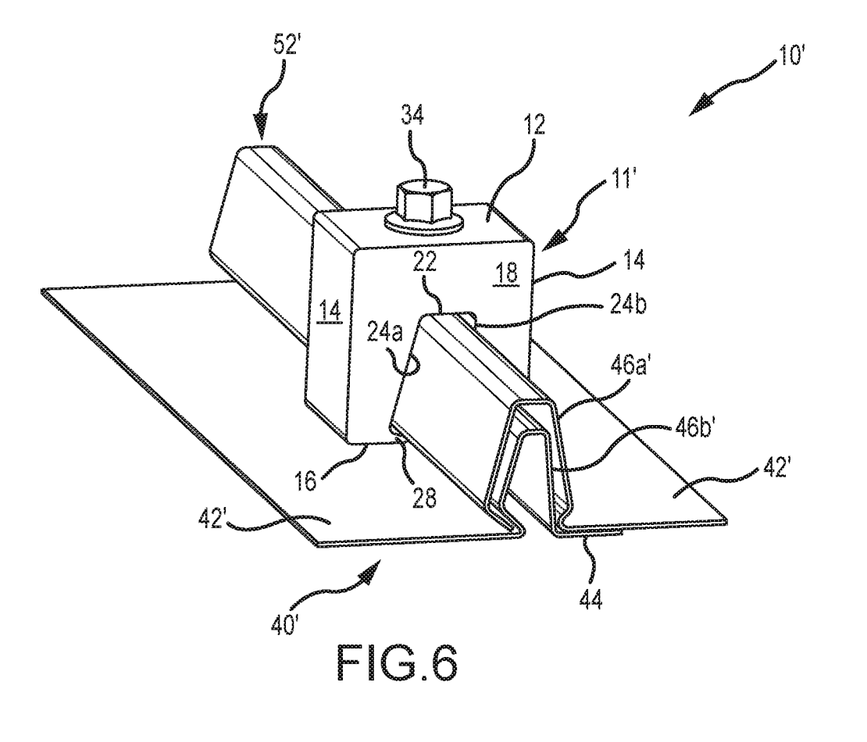
FIG. 6 is a perspective view of the mounting device of FIG. 5, positioned on a seam of a panel assembly defined by multiple nail strip panels of a second configuration.
Figure 7:
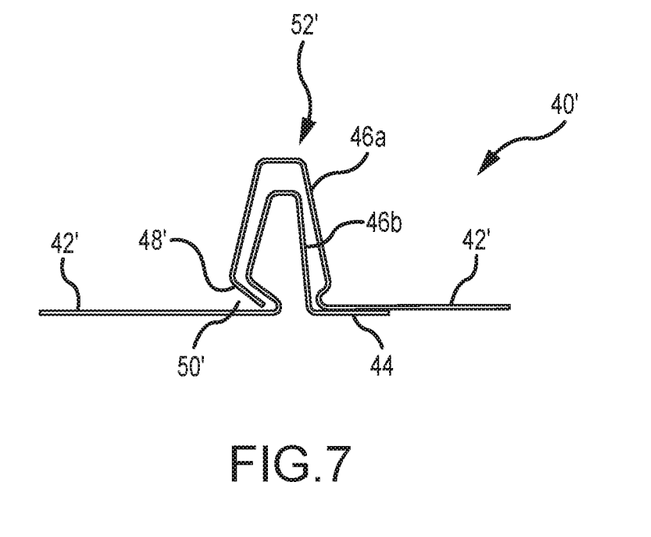
FIG. 7 is an enlarged end view of a standing seam from the panel assembly of FIG. 6.

FIG. 6 shows the mounting device 10' of FIG. 5 being positioned on a standing seam 52' of another embodiment of a panel assembly 40'. The panel assembly 40' is defined by nail strip panels 42' at least generally of the above-described type, but which use a left seam rib 46a' and right seam rib 46b' of a different configuration that discussed above, which in turn collectively define a standing seam 52' of a different configuration. The nose 28 of the mounting device 10' is again positioned within the recess 50' on one side of the standing seam 52' and at least generally in accordance with the foregoing. However, the recess 50' is of a different configuration, being defined primarily by the end section 48' of one nail strip panel 42' and a base section of the other nail strip panel 42' that defines this seam 52'.

It should be appreciated that the mounting device 10 may be used on the panel assembly 40', and that the mounting device 10' may be used on the panel assembly 40. Each of the mounting devices 10, 10' may be used by any panel assembly defined by nail strip panels of the type described herein (where each nail strip panel includes two seam ribs that are spaced in its width dimension, such that one seam rib of one nail strip panel may be "nested" with a seam rib of an adjacent nail strip panel to define a standing seam).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A standing seam mounting device comprising: a mounting body comprising:
    an upper surface spaced apart from an oppositely disposed first lower surface, the upper surface comprising a flat section facing in a first direction and the first lower surface facing in a second direction opposite the first direction;
    a slot disposed adjacent the first lower surface, the slot extending into the mounting body and defined by a first slot sidewall extending to proximate the first lower surface and disposed at a first angle, a second slot sidewall extending to proximate a second lower surface parallel to the first lower surface, the second slot sidewall fixed relative to the first slot sidewall and disposed at a second angle different than the first angle, and a slot base extending between and connecting the first and second slot sidewalls along a first length;
    at least one seam fastener extendable through the mounting body and the second slot sidewall into the slot, the at least one seam fastener positioned closer to the second lower surface than the upper surface; and
    at least one mounting fastener extendable through the upper surface, the mounting body, and the slot base into the slot, wherein the first slot sidewall comprises:
    a first nose protruding into the slot and spaced from the second slot sidewall by a first distance greater than the first length;
    an upper planar section extending at the first angle from proximate the slot base to a centerline of the at least one seam fastener; and
    a lower planar section coplanar with the upper section and extending from a centerline of the at least one seam fastener to proximate the first nose, the first nose positioned between the lower section and the first lower surface, and wherein the second sidewall is substantially orthogonal with the flat section.

2. The standing seam mounting device of claim 1, wherein the mounting body is of a one-piece construction.

3. The standing seam mounting device of claim 1, wherein the first and second slot sidewalls each comprise a planar section.

4. The standing seam mounting device of claim 1, wherein the first angle is measured in the slot between the slot base and the upper section of the first slot sidewall and the second angle is measured in the slot between the slot base and the second slot sidewall.

5. The standing seam mounting device of claim 4, wherein the first angle is greater than the second angle.

6. The standing seam mounting device of claim 4, wherein the first angle is greater than 90°, and wherein the second angle is at least substantially 90°.

7. The standing seam mounting device of claim 1, wherein a spacing between the first slot sidewall and the second slot sidewall progressively and continually increases proceeding away from the slot base and to the first nose.

8. The standing seam mounting device of claim 1, wherein a third distance from the upper surface to the first lower surface is greater than a second distance from the upper surface to the second lower surface.

9. The standing seam mounting device of claim 8, wherein the second distance and the third distance are measured along a line substantially orthogonal to the flat section.

10. A standing seam mounting device installed on a panel assembly having a first standing seam, the standing seam mounting device comprising:
    a mounting body comprising an upper surface spaced apart from an oppositely disposed first lower surface, the upper surface comprising a flat section facing in a first direction, the first lower surface facing in a second direction opposite the first direction;
    a slot disposed adjacent the first lower surface of the mounting body, the slot extending into the mounting body and defined by a first slot sidewall, a second slot sidewall fixed relative to the first slot sidewall, and a slot base extending between and connecting the first and second slot sidewalls, wherein the first slot sidewall extends to proximate the first lower surface and is positioned at a first angle relative to the slot base, and the second slot sidewall extends to proximate a second lower surface parallel to the first lower surface and is positioned at a second angle relative to the slot base, the second angle being different than the first angle;
    a first seam fastener extendable through the mounting body and through the second slot sidewall into the slot; and
    at least one mounting fastener extendable through the mounting body into the slot,
    wherein the second slot sidewall extends from the slot base at least substantially orthogonally to the slot base,
    wherein the first slot sidewall comprises:
        a first nose positioned at a lowermost end of the first slot sidewall proximate the first lower surface, the first nose protruding into the slot and toward the second slot sidewall; and
        a first flat section diverging away from the second slot sidewall, the first flat section extending from proximate the slot base to proximate the first nose, and
    wherein a first orthogonal distance between the flat section of the upper surface and the first lower surface is greater than a second orthogonal distance between the flat section of the upper surface and the second lower surface.

11. The standing seam mounting device of claim 10, wherein the at least one mounting fastener extends through the slot base.

12. The standing seam mounting device of claim 10, wherein the at least one mounting fastener comprises two mounting fasteners.

13. The standing seam mounting device of claim 10, wherein the mounting body is of a one-piece construction.

14. The standing seam mounting device of claim 10, wherein the first angle is greater than the second angle.

15. The standing seam mounting device of claim 10, wherein the first angle is greater than 90° and the second angle is at least substantially 90°.

16. The standing seam mounting device of claim 10, wherein the mounting body further comprises a first exterior planar surface extending from proximate the upper surface to proximate the first lower surface.

* * * * *